(12) United States Patent
Wang et al.

(10) Patent No.: US 8,560,962 B2
(45) Date of Patent: Oct. 15, 2013

(54) PROMOTING PARTICIPATION OF LOW-ACTIVITY USERS IN SOCIAL NETWORKING SYSTEM

(75) Inventors: James H. Wang, San Francisco, CA (US); Naomi Gleit, Palo Alto, CA (US); Peter H. Martinazzi, San Francisco, CA (US); Kiranjit S. Sidhu, Mountain View, CA (US); Lex Arquette, San Jose, CA (US); Jeffrey C. Wieland, Salisbury, MD (US); Jennifer Burge, San Francisco, CA (US); Jun Liu, Sunnyvale, CA (US); Alexander P. Schultz, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 511 days.

(21) Appl. No.: 12/751,590

(22) Filed: Mar. 31, 2010

(65) Prior Publication Data

US 2011/0246907 A1    Oct. 6, 2011

(51) Int. Cl.
  *G06F 15/173* (2006.01)
  *G06F 3/01* (2006.01)
(52) U.S. Cl.
  USPC .......................................... 715/789; 715/751

(58) Field of Classification Search
  USPC .................................................. 715/751, 789
  See application file for complete search history.

(56) References Cited

U.S. PATENT DOCUMENTS

| | | | |
|---|---|---|---|
| 7,669,123 B2 | 2/2010 | Zuckerberg et al. | |
| 2008/0040474 A1 | 2/2008 | Zuckerberg et al. | |
| 2008/0040475 A1 | 2/2008 | Bosworth et al. | |
| 2008/0134053 A1* | 6/2008 | Fischer | 715/747 |
| 2009/0319288 A1* | 12/2009 | Slaney et al. | 705/1 |
| 2010/0064040 A1* | 3/2010 | Wise et al. | 709/224 |

* cited by examiner

*Primary Examiner* — Andrea Leggett
(74) *Attorney, Agent, or Firm* — Fenwick & West LLP (57) ABSTRACT

Method or system for allowing a social networking system to retain users of a social networking system by identifying low-activity users who are likely to become inactive/dormant users and prompting users to initiate interactions with the low-activity users. The low-activity users are identified by monitoring activities and interactions of the users via the social networking system. If the pattern of activities and interactions satisfy one or more criteria, a computer device for providing the social networking system initiates an intervention scheme where users are induced to initiate interactions with the low-activity users. In response to the interactions, the low-activity users are likely to resume interactions via the social networking system.

20 Claims, 3 Drawing Sheets

PROMOTING PARTICIPATION OF LOW-ACTIVITY USERS IN SOCIAL NETWORKING SYSTEM

BACKGROUND

This invention relates to retaining users in a social networking system by resuming or increasing interactions between the users of the social networking system.

The success of a social networking system hinges on attracting and retaining users, and encouraging those users to be active in the social networking system. Attracting and retaining users are important for at least the following two reasons. First, the number of users is critical to the number and quality of interactions between the users. As the number of the users increases, more user-generated content (UGC) (including postings and media items) become available via the social networking system. The increase in the UGC contributes to the increase in the number and quality of interactions between the users. Conversely, if the social networking system loses active users, the number and quality of interactions between the users tend to deteriorate, as the number and quality of the UGC deteriorate.

Second, the advertisement revenue of the social networking system depends largely on the number of active users. Many social networking systems do not charge fees for membership. Instead, these social networking systems rely on revenue generated from online advertisements to sustain their business. With more revenue, the social networking system in turn can attract more users by adding more resources (e.g., servers) and/or providing other useful services. Hence, attracting and retaining active users in the social networking systems are also important from the business perspective of the social networking systems.

To attract and retain users and to encourage the users to interact, social networking systems have traditionally relied on various methods, such as providing unique and helpful information unavailable in other services, advertising the social networking system, compensating referrals from other websites or users, and providing free access to resources such as storage space or data (e.g., media items). Such ways of attracting and retaining users have limited efficacy, and hence, users of the social networking systems tend to decrease gradually as other competing systems emerge.

SUMMARY

Embodiments relate to encouraging greater participation of a low-activity user in a social networking system, where the low-activity user is one who is currently showing a low level of activity within a social networking system. A user's level of activity in the social networking system may be measured in any of a number of ways, such as the frequency of logging in, viewing pages, or interacting with other users. To encourage greater participation of a low-activity user, the social networking system sends a recommendation to another user of the social networking system that has an established connection to the low-activity user, where the recommendation suggests that the other user interact in some way with the low-activity user. The recommendation may be sent to the user in response to the user's interaction with the social networking system. The recommendation may also include a link that enables the user to perform the suggested interactions with the low-activity user by choosing to take an action according to the recommendation. By encouraging users of a social networking system to interact with low-activity users, the low-activity user's experience in the social networking system is improved, and the low-activity user is thus more likely to become a more active participant in the social networking system.

In one embodiment, the action items suggested in the recommendation are determined based on at least one of (i) information about the low-activity user, (ii) whether a recommendation was previously made or acted upon by other users and/or (iii) media source items (e.g., audio files, video files, image files, links and postings) provided by the low-activity user.

In one embodiment, the page of information comprises one or more user interface elements for display to the user. Each user interface element representing an action item for encouraging the low-activity user to increase activities in the social networking system. When the user selects one of the user interface elements, an action item corresponding to the selected user interface element is initiated.

In one embodiment, an affinity between the user and the user's connections are determined. To generate a recommendation for the user, the social networking system selects a low-activity user from among the user's connections based at least in part on the user's affinity for the user's connections. In this way, the recommendation is more likely to be acted upon, since the user receiving the recommendation is more likely to be interested in the low-activity user who is the subject of the recommendation.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

Embodiments of the present invention provide an intervention scheme that allows a social networking system to identify low-activity users who are likely to become inactive/dormant users and prompting users to initiate interactions with the low-activity users. The low-activity users are identified by monitoring activities and the users' interactions via the social networking system. If the pattern of activities or interactions satisfies one or more criteria, the social networking system initiates an intervention scheme where the user is recommended to take actions that induce interactions with the low-activity users. In response to the interactions, the low-activity users are likely to resume interactions via the social networking system. In this way, the likelihood that the low-activity users will become inactive or dormant is reduced.

A low-activity user described herein refers to a user of a social networking system showing a low level of actions in the social networking system, and is likely to become inactive or dormant user. If a user becomes inactive or dormant, the user no longer actively interacts with other users via the social networking system.

Connections described herein are usually in both directions, but need not be. For example, if Nair and Sam are both users and connected to each other on the social networking system, Nair and Sam, both users, are also each other's connections. If, on the other hand, Nair wishes to connect to Sam to view Sam's posts, but Sam does not wish to form a mutual connection, a one-way connection is also possible. The connection between users may be a direct connection; however, some embodiments of a social networking system allow the connection to be indirect via one or more levels of connections or degrees or separation. Also, the term connection need not require that users actually be connections in real life, (which would generally be the case when one of the users is a business or other entity); it simply implies a connection in the social networking system. Further, not all social networking systems require membership, so the term "user" can refer to any user interacting with or using a social networking system, with or without having a membership.

A page of information described herein refers to any type of media content that may be provided by a social networking system. The page of information may be in the form of a webpage that embeds source media items such as, video files, audio files, images, comments, documents, maps, and a status message indicating what a user is doing, interested in or engaged in.

The "user" described herein refers to any user of a social networking system. A user can be an individual person, a group (e.g., a band or club), a business enterprise, or even a fictional character or entity.

Affinity as described herein refers to strength of connections or ties between the users. Not all connections between the users may be equal. For example, a user having a high affinity with another user may share strong interest and/or communicate extensively between each other. In contrast, a user having a low affinity with another user may share little or no interest and communicate infrequently with each other.

Architecture and Operation of System

Figure 1:
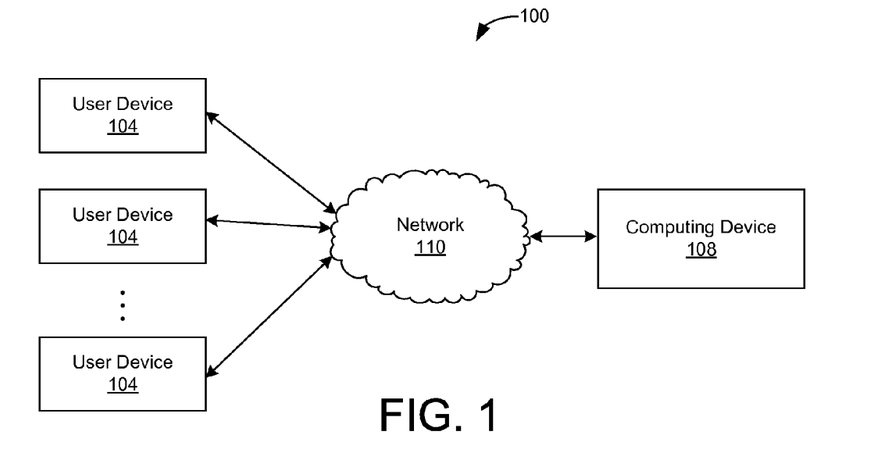
FIG. 1 is a schematic diagram illustrating a system for providing a social networking system, according to one embodiment.

FIG. 1 is a schematic diagram illustrating a social networking system 100 according to one embodiment. The system 100 includes, among other components, user devices 104 and a computing device 108. The user devices 104 are connected via a network 110 (e.g., Internet) to the computing device 108. The system 100 may include other components not illustrated in FIG. 1. For example, the system 100 may include a payment system for clearing any financial transactions performed via the computing device 108.

The computing device 108 maintains data for providing the social networking system to the users. The computing device 108 may, for example, be implemented on a server that is located remotely from the user devices 104. The computing device 108 may also include various servers (not shown) for caching frequently requested data objects, and network security devices (not shown) for preventing unauthorized access to data. Although FIG. 1 illustrates only a single computing device, the computing device 108 may consist of multiple servers operating in concert. In one embodiment, the computing device 108 includes components, as described below in detail with reference to FIG. 2.

The user devices 104 are accessed by users to take advantage of the social networking system. The user devices 104 may include, but are not limited to, personal computers, mobile phones, personal navigation devices (PNDs), music players, gaming consoles, handheld computers, personal digital assistants (PDAs), networking devices, cameras, GPS receivers, netbooks and smartphones. An example user device 104 is described below in detail with reference to FIG. 3.

In one embodiment, a user initiates communication with the computing device 108 using the user device 104. Authentication information (e.g., user ID and password) is sent from the user device 104 to the computing device 108 via the network 110. After authenticating the user, the computing device 108 generates and sends a page of information (e.g., a webpage) for the user. The user may also upload source media items (e.g., postings and video files) to the computing device 108 via the user device 104. The uploaded source media items may be stored in the computing device 108 and may be used as source information for generating customized page of information for other users.

Social Networking System

In one embodiment, the computing device 108 performs a large bulk of operations associated with providing the social networking systems to the users. The user devices 104, on the other hand, are assigned with less intensive operations, mostly associated with interfacing with the users. In most cases, the computing device 108 will have much larger computation capacity and storage capacity compared to the user devices 104.

Figure 2:
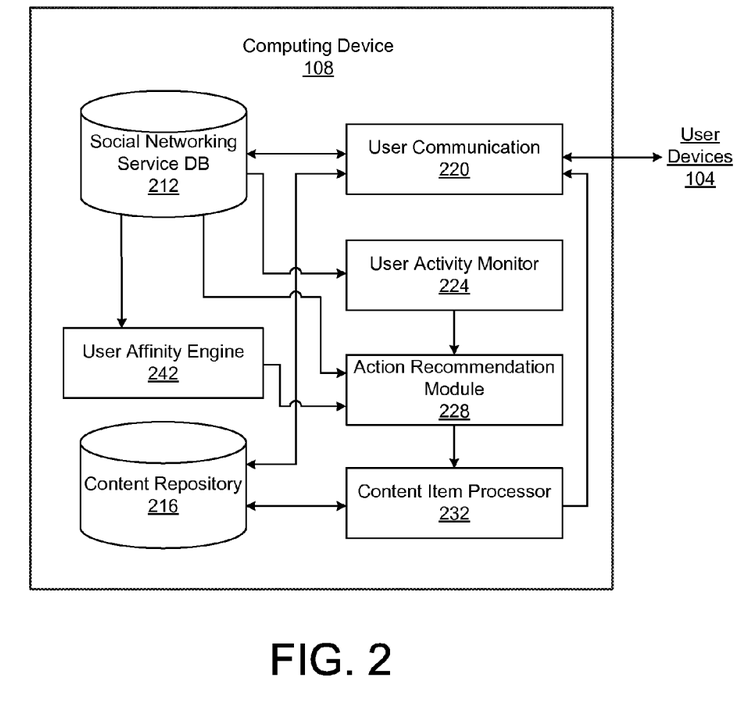
FIG. 2 is a block diagram illustrating a computing device for providing the social networking system, according to one embodiment.

FIG. 2 is a block diagram illustrating the computing device 108 for providing the social networking system, according to one embodiment. The computing device 108 may include, among other components, social networking system database 212, user communication module 220, content repository 216, user activity monitor 224, action recommendation module 228, content item processor 232, and user affinity engine 242. One or more components of the computing device 108 may be implemented in hardware, software, firmware or any combinations thereof. Although illustrated as separate modules, two or more components of the computing device 108 may be combined into a single module. In one embodiment, at least some of these components are implemented as a set of computer instructions that are stored in memory and executed by a processor in the computing device 108.

The user communication module 220 communicates with the user devices 104 via the network 110. The user communication module 220 may include network cards, routers, other networking devices, and software or firmware for communicating with the user devices 104 over the network 110 using networking protocols such as TCP/IP. In one embodiment, the user communication module 220 is configured to simultaneously establish sessions with multiple users.

The social networking system database 212 stores data associated with users of the social networking system, including but not limited to, user authentication data, user profiles, user activity data (e.g., log information), a social relationship map, and privacy settings of the users. The user activity data indicate the level of interactions each user is having with other users via the social networking system. As described below, the user activity data are analyzed and processed by the user activity monitor 224 to identify low-activity users. The social relationship map indicates the social relationships between users. The privacy setting indicates the extent to which the information is to be shared with other users.

The user affinity engine 242 accesses the social networking system database 212 to determine the affinity between the users. More specifically, the user affinity engine 242 analyzes the social relationships between the users and determines the degree of affinity between users. The higher degree of affinity between two users translates to a higher likelihood that two users may affect each other's behavior. The user affinity engine 242 may be implemented using, for example, the technology disclosed in U.S. patent application Ser. No. 11/503,093, entitled "Systems and Methods for Measuring User Affinity in a Social Network Environment," filed on Aug. 11, 2006, which is incorporated by reference herein in its entirety. In one embodiment, the user affinity engine 242 updates the social map to indicate the degree of affinity between the users.

The user activity monitor 224 reads information stored in the social networking system database 212 to identify low-activity users. The low-activity users are identified based on one or more criteria including, but not limited to, (i) login frequency to the social networking system dropping below a threshold, (ii) decreasing trend in the login frequency, (iii) the amount of data transmitted over the social networking system (e.g., number of the user posts content and numbers of user profile page downloads), (iv) the number of interactions (e.g., number of messages exchanged, number of participations in online events, and number of feeds received) with other users, (v) the average login time, (vi) reference to other social networking systems in the users' messages, (vii) the number of connections to other users in the social network, (viii) the number of page views and (ix) clicks or impressions viewed. In one embodiment, the user activity monitor 224 adopts a point system that assigns different points or scores to any of these factors. In this embodiment, a user is identified as a low-activity user if the accumulated points or scores exceed a threshold or drops below a threshold.

The action recommendation module 228 determines action items to be taken to promote the participation of the low-activity users. The action recommendation module 228 receives, from the user affinity engine 242, information about the low-activity users from the user activity monitor 224 and the information about other users having a high degree of affinity with the low-activity users from the user affinity engine 242. Based on the identify of the low-activity users and the other users having close social relationships with the low-activity users, the action recommendation module 228 determines the action items to be recommended to the users for promoting participation of the low-activity users. In most circumstances, the users to whom the action items are recommended are highly active users but any users including the low-activity users may be recommended with action items.

The actions for recommendation to the users include, among others, (i) writing or posting content related to the low-activity users, (ii) introducing another user with whom the low-activity users may form social relationships, (iii) suggesting updating of the user profiles of the low-activity users, (iv) sending or posting messages associated with the low-activity users (e.g., commenting on photos of the low-activity users, sending messages wishing the low-activity user a happy birthday, and leaving messages on the low-activity user's page or wall), (v) sending gifts (including virtual points or credit) to the low-activity users, and (vi) tagging photos of the low-activity user.

In one embodiment, different activities may be recommended on a rotating basis to the users. That is, if a user was recommended to write or post contents about a low-activity user, another user may be recommended to send messages to the same low-activity user. The page of information presented to the user is described below in detail with reference to FIG. 5. In another embodiment, different action items may be recommended to the users in a random fashion. When randomly suggesting action items, frequency capping may be implemented so that an activity is no longer recommended after the same action item is recommended to the same or different users over a certain frequency threshold.

In one embodiment, the action recommendation module 228 keeps track of actions taken by the users in response to the recommendation. The action recommendation module 228 may maintain statistical data related to the frequency that the recommended activity was taken by the other users. The data stored in the action recommendation module may include, among others, timestamps, viewer ID, types of action items in the recommendation and ID of target user. Moreover, the action recommendation module 228 may also record the frequency that the low-activity user responded to the user's action. Based on the statistical data, the action recommendation module 228 may prioritize action items that are more likely to induce low-activity users' actions. For example, if a user successfully prompted a low-activity user to interact by engaging in one type of action item, the action recommendation module 228 may make the same recommendation to another user to promote the interaction with the same low-activity user. Further, the statistical data may be used to identify key users important to expanding or maintaining active users in the social networking system. Such key users may be rewarded in various manners to ensure their continued participation in the social networking system.

The content repository 216 stores data for generating the page of information for users. The data stored in the content repository 216 may include various types of media source items such as audio files, video files, image files, links and postings. The media source items are used as source information for creating a page of information customized for each user. In one embodiment, the content repository 216 is implemented as a database.

The content item processor 232 generates the page of information for the users based on the media source items available from the content repository 216. In one embodiment, the page of information is customized for each user based on the user profiles or connections with other users. The content item processor 232 also receives recommended action items from the action recommendation module 228. Based on the recommended action items, the content item processor 232 includes user interface elements (e.g., icons) representing the recommended action items in the page of information for the user. The page of information generated by the content item processor 232 is sent to the user communication module 220 for transmittal to the user devices 104. In one embodiment, the content generated by the content item processor 232 is a webpage, as described below in detail with reference to FIG. 5.

Although the components of the computing device 108 are illustrated as being included in a single computing device in FIG. 2, one or more components may be embodied on a separate computer. Further, in order to serve a large number of users, the computing device 108 may consist of a large number of servers and networking equipments that may be located in a single geographic region or in different geographic regions.

In one embodiment, the computing device 108 includes a processor, memory and a bus connecting the processor and the memory. The memory is a computer-readable storage medium that stores a plurality of computer instruction modules for performing functions of each component described above with reference to FIG. 2. The instructions in the memory is retrieved and executed by the processor. In another embodiment, the computer device 108 includes firmware and hardware dedicated to perform the functions of the components described above with reference to FIG. 2.

Example User Device for Accessing the Social Networking System

Figure 3:
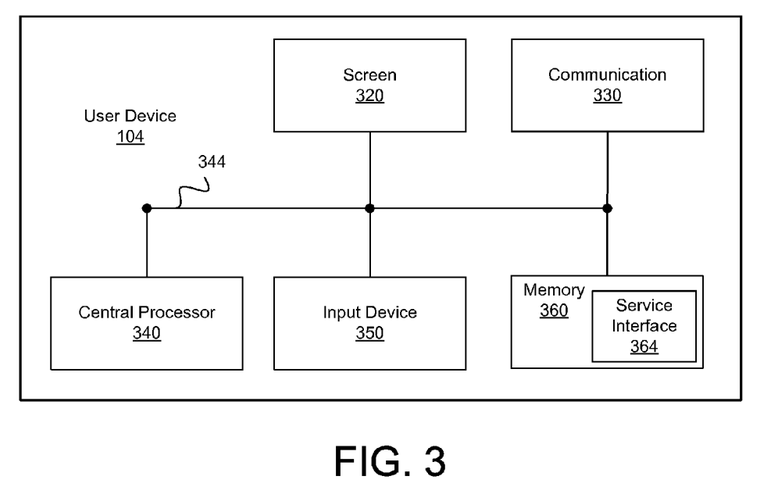
FIG. 3 is a block diagram illustrating a user device for accessing the social networking system, according to one embodiment.

FIG. 3 is a block diagram illustrating the user device 104 for accessing the social networking system, according to one embodiment. The main function of the user device 104 in the context of social networking system is to interface with the users. The user device 104 may include, among other components, screen 320, communication module 330, central processor 340, input device 350, memory 360, and bus 344 connecting these components. The user device 104 may include other components (e.g., speaker) that are not illustrated in FIG. 3.

The screen 320 presents visual information to the user. The visual information may include, among others, information associated with accessing the social networking system and other services accessible via the user device 104.

The communication module 330 communicates with the computing device 108 over the network 110 to access the social networking system. The communication module 330 may include, for example, a network card or a modem. The communication module 330 may communicate with the network 110 via a wireless or wired communication protocol.

The central processor 340 reads and executes instructions from the memory 360. The central processor 340 controls other components of the user device 104 according to the instructions. Although a single processor is illustrated in FIG. 3, the user device 104 may include multiple processors to increase its computational capacity.

The input device 350 may include various user interface devices such as a keyboard, a mouse, a keypad and a touchscreen. Two or more input modules may be provided as the input device 350 to facilitate various types of user interactions.

The memory 360 stores data including, among others, computer instruction modules for performing certain functions of the user device 104. The instructions stored in the memory 360 may be read and executed by the central processor 340. Among other computer instruction modules, the memory 360 stores a service interface module 364. The service interface module 364 is an application used for accessing and interfacing with the social networking system. In one embodiment, the service interface module 364 is embodied as a web browser. In another embodiment, the service interface 364 is a software program dedicated to accessing the social networking system.

Method of Promoting Engagement of Low-Activity Users

Figure 4:
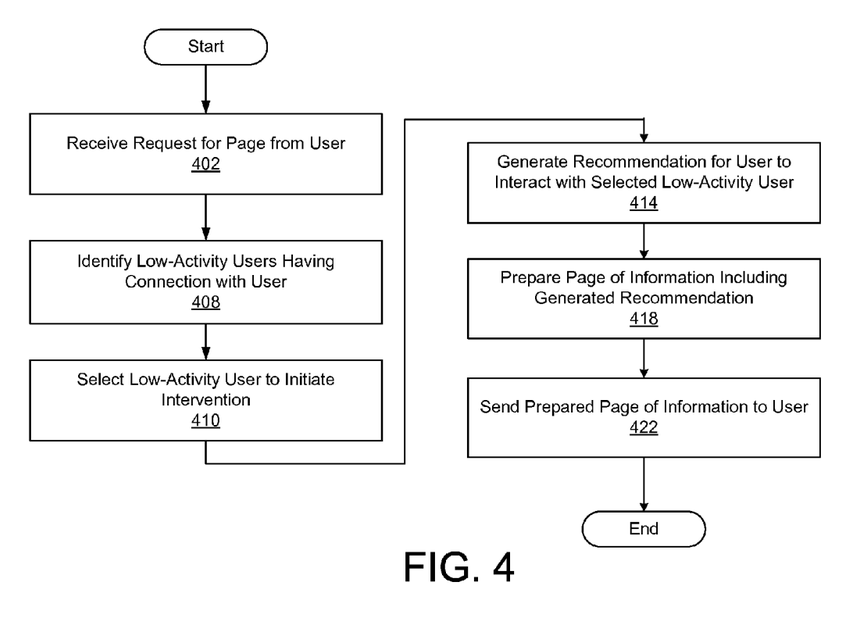
FIG. 4 is a flowchart illustrating a process of inducing interactions with low-activity users in a social networking system, according to one embodiment.

FIG. 4 is a flowchart illustrating a process of inducing low-activity users to engage with and interact within a social networking system, according to one embodiment. First, the computing device 108 receives 402 a request for a page of information from a user. In one embodiment, the service interface 364 sends the request for the page of information automatically to the computing device 108 after the user logs onto the social networking system.

The user activity monitor 224 accesses the information stored in the social networking system database 212 to identify 408 the low-activity users having connections with the logged-in user. The accessed information in the social networking system may include, among others, log information indicating the time and duration of the users' access to the social networking system, the amount of data sent or received via the social networking system, and the count of interactions (e.g., number of messages exchanged, number of participations in online events, and number of feeds received) with of the users via the social networking system.

In one embodiment, the user activity monitor 224 also receives information from the content repository 216 such as the total number or size of data items that a particular user stored in or retrieved from the content repository 216.

In one embodiment, the user affinity engine 242 selects 410, for each user, target low-activity users to recommend action items. If there are more than one low-activity users having connections with the logged-in user, the low-activity users may be prioritized based on the likelihood that the low-activity users will respond to the logged-in user's action. Various criteria such as degree of affinity may be considered in determining the likelihood that the low-activity users will respond. For example, a low-activity user having a high degree of affinity with the user is chosen over other low-activity users having a low degree of affinity with the requesting user. In an alternative embodiment, the low-activity users for intervention are selected randomly without taking into account the degree of affinity between the users. In still another embodiment, the user affinity engine 242 selects, for each target low-activity user, connected users to recommend action items that may invoke the low-activity user's participation.

In one embodiment, the user affinity monitor 242 may analyze information (e.g., a social map) in the social networking system database 212 to determine which low-activity users have a connection with the logged-in user. The user affinity monitor 242 may also determine the degree of affinity between the users, for example, using, the technology disclosed in U.S. patent application Ser. No. 11/503,093, entitled "Systems and Methods for Measuring User Affinity in a Social Network Environment," filed on Aug. 11, 2006, which is incorporated by reference herein in its entirety.

The action recommendation module 228 then determines 414 one or more action items to be taken by the user to induce the low-activity user's action. The action items to be taken may be determined based on one or more of the following factors: (i) the profile of the low-activity user, (ii) the profile of the user, (iii) media source items provided by the low-activity user, (iv) likelihood that the user will choose to perform the action items, and (v) the low-activity user's previous interactions with other users in the social networking system. For example, the action recommendation module 228 may analyze the profile information of the low-activity user to determine if the low-activity user's birthday or wedding anniversary is approaching, and recommend action items associated with such anniversary to the logged-in user (e.g., send a message wishing happy birthday). Alternatively, the action recommendation module 228 may determine the action items randomly.

Based on the determined action items, the content item processor 232 prepares 418 a page of information embedding the user interface elements (e.g., icon or links). Each user interface element represents the determined action items. In one embodiment, the page of information includes various types of media source items such as audio files, video files, image files, links and postings. Some of such media source items may be user-generated content (UGC) provided by other users of the social networking system. The page of information for a user may be customized to include "feed" from other connected users, for example, as described in U.S. patent application Ser. No. 11/503,242 entitled "System and Method for Dynamically Providing a News Feed about a User of a Social Network," filed on Aug. 11, 2006, which is incorporated by reference herein in its entirety.

The generated page of information is then sent 422 to the logged-in user that requested the page of information. Specifically, the generated page of information may be sent via the network 110 to the user device 104 of the user that requested the page of information. After receiving the page of information, the user may choose to perform an action item as recommended in the page of information. In one embodiment, a reward is awarded to the user who chooses to perform a recommended action item. The reward, for example, may be virtual credits, gifts or items.

The user's action item performed by the user may create a newsfeed as described, for example, in U.S. patent application Ser. No. 11/503,037, entitled "Communicating a Newsfeed of Media Content Based on a Member's Interactions in a Social Network Environment," filed on Aug. 11, 2006, which is incorporated by reference herein in its entirety.

The sequence of steps in FIG. 4 is merely illustrative. Various modifications may be made to the method including performing some steps in parallel, performing steps in a sequence different from what is illustrated in FIG. 4, and adding additional steps. For example, the step 408 of identifying the low-activity user may be performed before the step 402 of receiving the request for page from the user.

Example Page of Information Recommending Actions by Users

Figure 5:
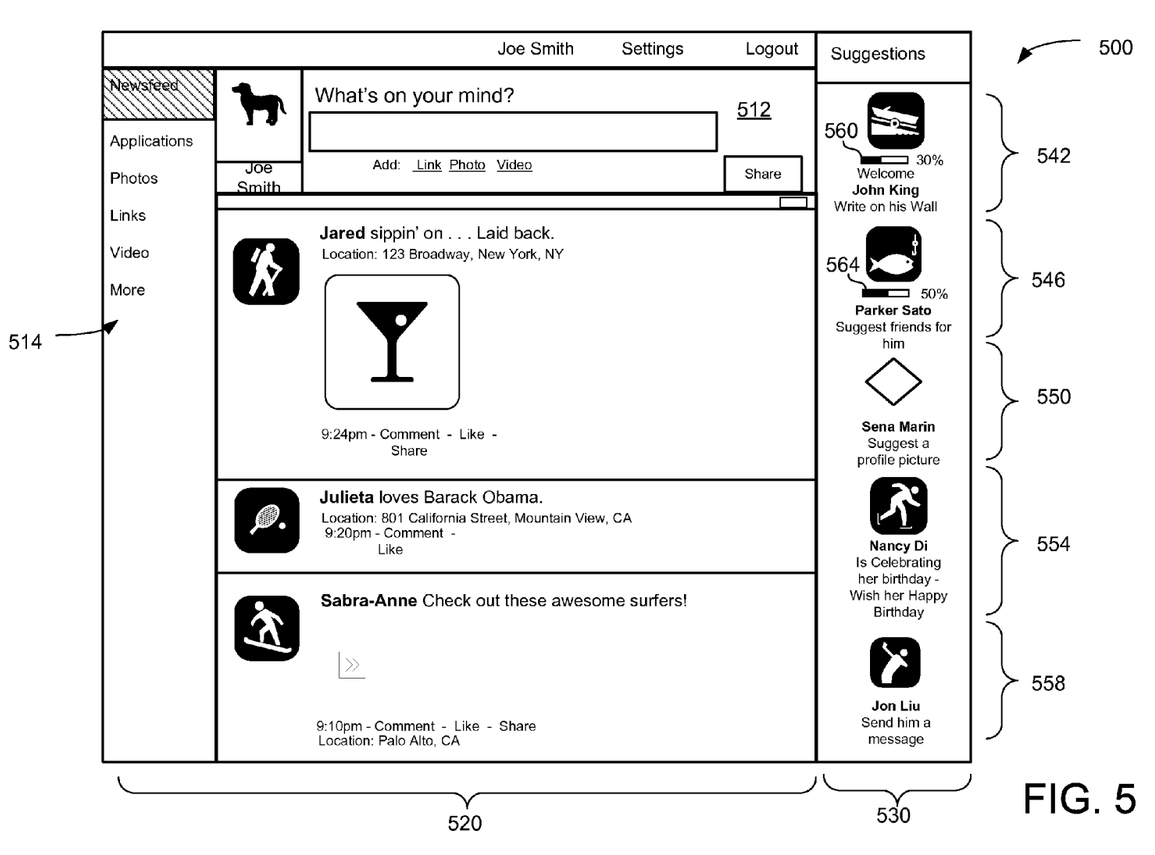
FIG. 5 is a graphical user interface displayed on the user device, according to one embodiment.

FIG. 5 is a graphical user interface 500 displayed on the user device 104, according to one embodiment. The graphical user interface 500 includes source content area 520 and recommendation area 530. The source content area 520 includes one or more source media items such as postings, video files, audio files, and links stored in the content repository 216. The user of the user device 114 may choose to upload and publish media source item by providing files or messages in user input area 512. The media source items provided by the user may then be stored in the content repository 216 for sharing with other users having social relationships with the user.

The user may also choose a webpage to view by clicking an item in navigation area 514 in the source content area 520. FIG. 5 illustrates "Newsfeed" as currently being selected for display.

The recommendation area 530 includes recommendations to induce interactions of the low-activity users. In the example of FIG. 5, five low-activity users are listed in areas 542 through 558. These low-activity users are identified by the user activity monitor 224, as described above with reference to FIG. 2. For each low-activity user, recommended action items such as "write on his wall," "suggest friends to him," "suggest a profile picture," "wish her happy birthday," and "send him a message" are provided. The recommended action items are selected by the action recommendation module 228 for inclusion in the page of information 500, as described above with reference to FIG. 2.

Bars 560 and 564 indicate the degree that the profile of the corresponding users is completed. In the example of FIG. 5, John King's profile is 30% completed and Parker Sato's profile is 50% completed.

Each of areas 542 through 558 include a link for sending a request to the computing device 108 when the user presented with the page of information 500 clicks any of these areas 542 through 558. After receiving the request, the computing device 108 may then perform operations chosen by the user or send a subsequent page of information (e.g., webpage) that facilitates the user to accomplish the chosen action item (e.g., present a webpage for sending a message to a low-activity user).

In another embodiment, the recommendation area 530 may include action items for other active users as well as low-activity users. The action items in the recommendation area 530 may be arranged in a manner that does not distinguish action items for user and action items for low-activity users. Alternatively, the recommendation area 530 may include indications as to which users are a low-active and which users are not low-activity users.

The page of information 500 in FIG. 5 is merely illustrative. Various media source items may be provided in different arrangements. For example, the source content area 520 and the recommendation area 530 may not be clearly distinguished into different sections of the page of information. Further, various types of other actions may be recommended for the low-activity users.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
maintaining a plurality of connections for a user of a social networking system;
receiving a request for a page of information from the user;
identifying a low-activity user among the user's connections based on a level of activity in the social networking system of the low-activity user;
generating a recommendation for the user to interact with the low-activity user in the social networking system; and
sending the recommendation to the user for display.

2. The method of claim 1, wherein generating the recommendation is based on at least one of (i) information of the low-activity user maintained in the social networking system, (ii) whether the recommendation was previously made or acted upon by one or more users connected to the low-activity user, and (iii) information about the low-activity user's activities.

3. The method of claim 2, wherein the recommendation excluding a type of interaction responsive to a number of times that the type of interaction was taken by other users connected to the low-activity user exceeds a threshold number of times.

4. The method of claim 1, wherein the sending the recommendation comprises sending data for one or more user interface elements, each user interface element representing an action for interacting with the low-activity user; and responsive to the user selecting one of the user interface elements, initiating an action related to the selected user interface element.

5. The method of claim 1, wherein generating the recommendation comprises determining a degree of affinity between the user and the user's connections including the low-activity user.

6. The method of claim 1, wherein generating the recommendation comprises determining statistical data related to a frequency that a type of action was recommended to the low-activity user by other users of the social networking system.

7. The method of claim 1, wherein the recommendation comprises at least one of (i) writing or posting information related to the low-activity user, (ii) introducing another user with whom the low-activity user may form a connection in the social networking system, (iii) suggesting updating of a user profile of the low-activity user, (iv) sending a message to the low-activity user, and (v) sending a gift item to the low-activity user.

8. The method of claim 7, wherein the recommendation comprises, responsive to the low-activity user having a number of connections exceeding a threshold, at least one of (i) writing or posting information related to the low-activity user, (ii) suggesting updating of a user profile of the low-activity user, (iii) sending a message to the low-activity user, and (iv) sending a gift item to the low-activity user.

9. The method of claim 1, wherein the recommendation is selected based on likelihood that the user will act on the recommendation.

10. A non-transitory computer-readable storage medium storing instructions for providing a social networking system, the instructions when executed by a processor, cause the processor to:
maintain a plurality of connections for a user of a social networking system;
receive a request for a page of information from the user;
identify a low-activity user among the user's connections based on a level of activity in the social networking system of the low-activity user;
generate a recommendation for the user to interact with the identified low-activity user in the social networking system; and
send the recommendation to the user for display.

11. The computer-readable storage medium of claim 10, wherein the recommendation is based on at least one of (i) information of the low-activity user maintained in the social networking system, (ii) whether the recommendation was previously recommended or acted upon by other users connected to the low-activity user, and (iii) information provided by the low-activity user.

12. The computer-readable storage medium of claim 11, wherein the recommendation excluding a type of interaction responsive to a number of times that the type of interaction was taken by other users connected to the low-activity user exceeds a threshold number of times.

13. The computer-readable storage medium of claim 10, wherein instructions to:
send data for one or more user interface elements, each user interface element representing an action for interacting with the low-activity user; and
responsive to the user selecting one of the user interface elements, initiate an action related to the selected user interface element.

14. The computer-readable storage medium of claim 10, wherein instructions to generate the recommendation comprising instructions causing the processor to determine a degree of affinity between the user and the user's connections.

15. The computer-readable storage medium of claim 10, wherein the instructions to generate the recommendation comprises instructions for determining statistical data related to a frequency that a type of action was recommended to the low-activity user by other users of the social networking system.

16. The computer-readable storage medium of claim 10, wherein the recommendation comprises at least one of (i) writing or posting information related to the low-activity user, (ii) introducing another user with whom the low-activity user may form a connection in the social networking system, (iii) suggesting updating of a user profile of the low-activity user, (iv) sending a message to the low-activity user, and (v) sending a gift item to the low-activity user.

17. The computer-readable storage medium of claim 16, wherein the recommendation, responsive to the low-activity user having a number of connections exceeding a threshold, comprising at least one of (i) writing or posting information related to the low-activity user, (ii) suggesting updating of a user profile of the low-activity user, (iii) sending a message to the low-activity user, and (iv) sending a gift item to the low-activity user.

18. The computer-readable storage medium of claim 17, wherein the recommendation is selected based on likelihood that the user will act on the recommendation.

19. A computing device for providing a social networking system, comprising, comprising:
a processor;
a database configured to maintain a plurality of connections for a user of a social networking system;

a user activity monitor configured to identify a low-activity user among the user's connections based on a level of activity in the social networking system of the low-activity user;

an action recommendation module configured to generate a recommendation for the user to interact with the low-activity user in the social networking system; and a communication module configured to:
  receive a request for a page of information from the user; and
  send the recommendation to the user for display.

20. The computing device of claim 19, wherein the action recommendation module is configured to generate the recommendation based on at least one of (i) information of the low-activity user maintained in the social networking system, (ii) whether the recommendation was previously made or acted upon by one or more users connected to the low-activity user and (iii) information about the low-activity user's activities.

* * * * *

UNITED STATES PATENT AND TRADEMARK OFFICE
CERTIFICATE OF CORRECTION

| | | |
|---|---|---|
| PATENT NO. | : 8,560,962 B2 | Page 1 of 1 |
| APPLICATION NO. | : 12/751590 | |
| DATED | : October 15, 2013 | |
| INVENTOR(S) | : James H. Wang et al. | |

It is certified that error appears in the above-identified patent and that said Letters Patent is hereby corrected as shown below:

In the claims

Claim 19, column 12, line 64, after "system," delete "comprising,".

Signed and Sealed this
Fourteenth Day of October, 2014

Michelle K. Lee
*Deputy Director of the United States Patent and Trademark Office*